M. D. HAMBLE.
Egg-Beater.
No. 205,859. Patented July 9, 1878.
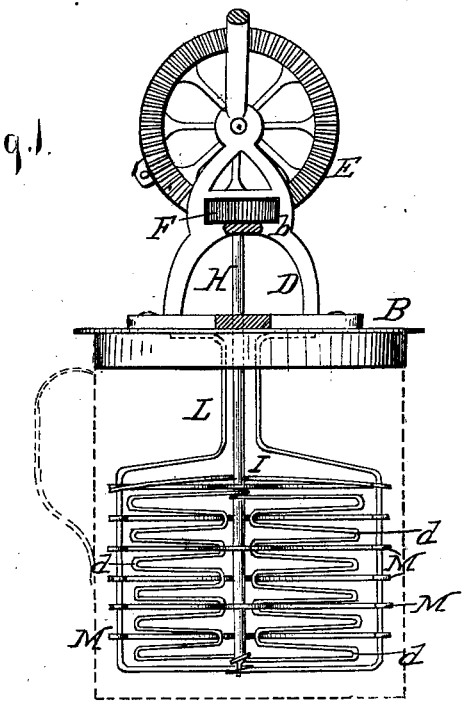
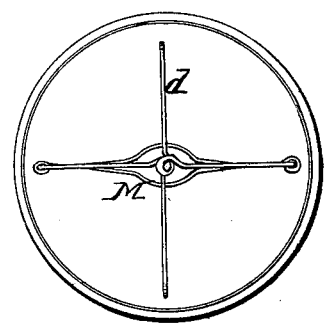
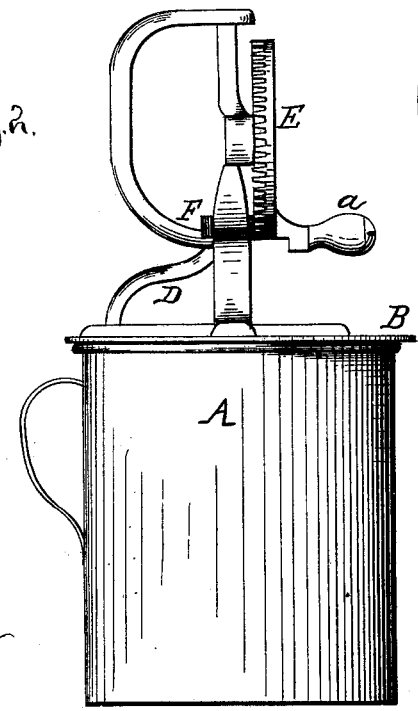
Witnesses:
J. Walter Fowler
Chas. O. Gill
Inventor:
Melvin D. Hamble
By his Attys.
Cox & Cox

UNITED STATES PATENT OFFICE.

MELVIN D. HAMBLE, OF MARSHALLTOWN, IOWA.

IMPROVEMENT IN EGG-BEATERS.

Specification forming part of Letters Patent No. 205,859, dated July 9, 1878; application filed December 14, 1877.

*To all whom it may concern:*

Be it known that I, MELVIN D. HAMBLE, of Marshalltown, in the county of Marshall and State of Iowa, have invented a new and useful Improvement in Egg-Beaters, of which the following is a specification, reference being had to the accompanying drawings.

The invention relates to an improved egg-beater; and consists in the devices hereinafter particularly described.

The object of the invention is to provide a convenient implement for beating eggs.

Figure 1 is a face view of the invention, with the barrel shown in dotted lines. Fig. 2 is a side elevation of same. Fig. 3 is a bottom view of the egg-beating devices.

In the accompanying drawings, A represents the barrel, which is provided with the top or cover B, at the center of which is provided the open stand D, upon one side of which is journaled the crown gear-wheel E, having the crank-handle a. The teeth of the gear E engage a pinion, F, that works in an aperture, b, in the stand, and is rigidly secured to the upper end of the shaft H, which extends downward through the cover, having secured to its lower parts the beater I, made preferably of wire, formed into elongated loops d, which alternately approach and recede from the shaft. These loops d form the arms of the beater, and stand in the same vertical plane with each other and with the shaft H.

To the under side of the cover B, on each side of the shaft H, are secured the upper ends of the stripper L. These ends extend downward, and are formed into a rectangular frame of sufficient size to permit the beater to rotate within it, the lower central parts of the frame being twisted, or otherwise suitably arranged, to form the lower bearing for the shaft H.

The sides of the frame L are connected by the rods M, which are bowed at their center, and pass through the loops alternately on opposite sides of the shaft H, being so spaced as to permit the loops d to pass freely between them, they operating as strippers to the loops when the beater revolves.

The operation is effected simply by placing the material in the barrel A and rotating the shaft H. This causes the rapid revolution of the beater I, which operates upon the material, striking it violently and causing it to come in violent contact with the stripper, producing an agitation that thoroughly aerates the material, thus effecting the operation of beating.

What I claim as my invention, and desire to secure by Letters Patent, is—

1. In an egg-beater, the shaft H, provided with the beater I, composed of the series of loops d, as shown, in combination with the stripper L, the sides of which are connected by the rods M, passing through the loops d, substantially as shown and described.

2. In an egg-beater, the stripper L, secured to the cover B, and having its sides connected by the rods M, each alternate one passing on opposite sides of the vertical shaft H, in combination with the beater I, composed of the open loops d, all being arranged substantially as shown and described.

In testimony that I claim the foregoing improvement in egg-beaters, as above described, I have hereunto set my hand this 6th day of September, 1877.

MELVIN D. HAMBLE.

Witnesses:
JAS. L. CALDWELL,
WM. J. HUSTON.